United States Patent [19]

Sporn

[11] Patent Number: 5,471,953
[45] Date of Patent: Dec. 5, 1995

[54] COLLARLESS DOG HARNESS AND LEASH JOINED THERETO

[76] Inventor: Joseph S. Sporn, 274 W. 86th St. #4B, New York, N.Y. 10024

[21] Appl. No.: 280,195

[22] Filed: Jul. 25, 1994

Related U.S. Application Data

[63] Continuation-in-part of Ser. No. 222,034, Apr. 4, 1994, which is a continuation-in-part of Ser. No. 194,720, Feb. 10, 1994, Pat. No. 5,359,964, which is a continuation-in-part of Ser. No. 23,638, Feb. 26, 1993, Pat. No. 5,429,886.

[51] Int. Cl.$^6$ .......................... A01K 27/00; A01K 15/00
[52] U.S. Cl. .......................... 119/792; 119/864; 119/907
[58] Field of Search .................................. 119/792, 793, 119/864, 865, 858, 863, 907, 905, 856; 54/65, 79.2, 23; 224/264, 184

[56] References Cited

U.S. PATENT DOCUMENTS

| | | | |
|---|---|---|---|
| 2,778,335 | 1/1957 | Hirsch | 119/793 |
| 3,435,867 | 4/1969 | Hyden | 224/264 |
| 5,125,219 | 6/1992 | Sligo | 54/23 |
| 5,134,836 | 8/1992 | Harty | 54/23 |
| 5,150,667 | 9/1992 | Salidrigas | 119/863 |
| 5,325,819 | 7/1994 | Krauss | 119/907 |
| 5,335,627 | 8/1994 | Bandimere | 119/856 |

FOREIGN PATENT DOCUMENTS

| | | | |
|---|---|---|---|
| 37572 | 7/1923 | Norway | 119/863 |
| 613033 | 11/1948 | United Kingdom | 119/907 |

*Primary Examiner*—Todd E. Manahan
*Attorney, Agent, or Firm*—Michael Ebert

[57] ABSTRACT

A leash-controllable dog harness adapted to inhibit a dog from straining against a leash held by an individual walking the dog and inducing the dog to come to a halt or to walk at a pace acceptable to the leash holder includes a shoulder junction provided with an openable loop which overlies the dog's shoulder intermediate its right and left forelegs, and a chest junction which lies adjacent the dog's chest intermediate the foreleg crotches. Extending between the shoulder and chest junctions on opposite sides of the dog are a pair of straps whose lengths are adjustable to accommodate the harness to the dog. Extending from the chest junction are a pair of restraint cables, one passing through the right foreleg crotch and then through the loop of the shoulder junction to terminate in a first ring, the other passing through the left foreleg crotch and then through the same loop to terminate in a second ring. Both rings are coupled to the leash whereby when the leash is strained, the cables are concurrently caused to ride up the respective crotches to impose pressure on the sensitive foreleg pits. This action induces the dog to seek to relieve the pressure by slowing down its pace or coming to a halt, depending on the degree of pressure applied to the pits.

14 Claims, 2 Drawing Sheets

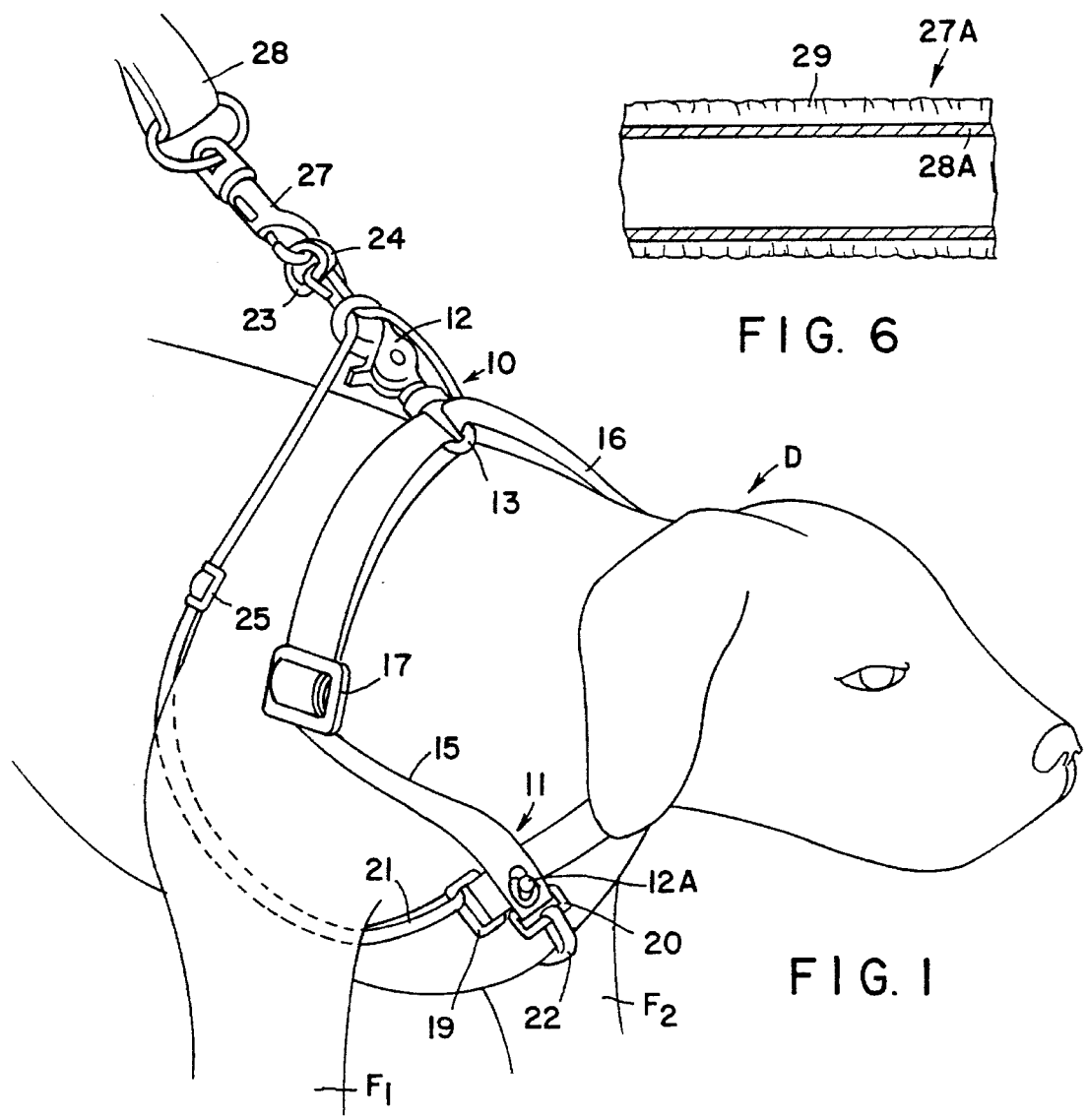
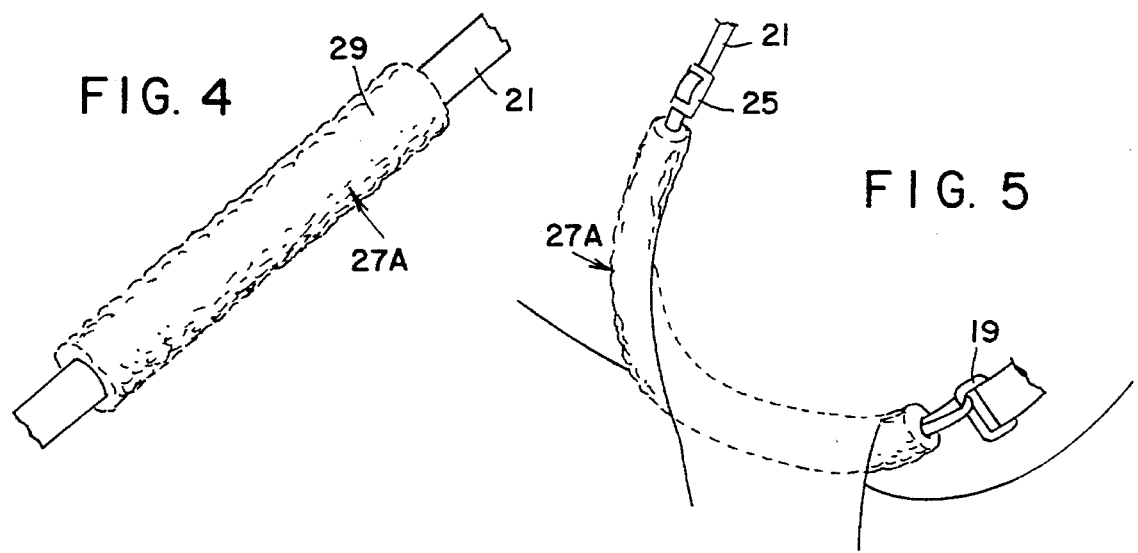

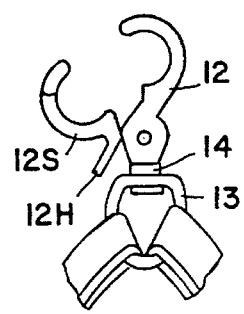
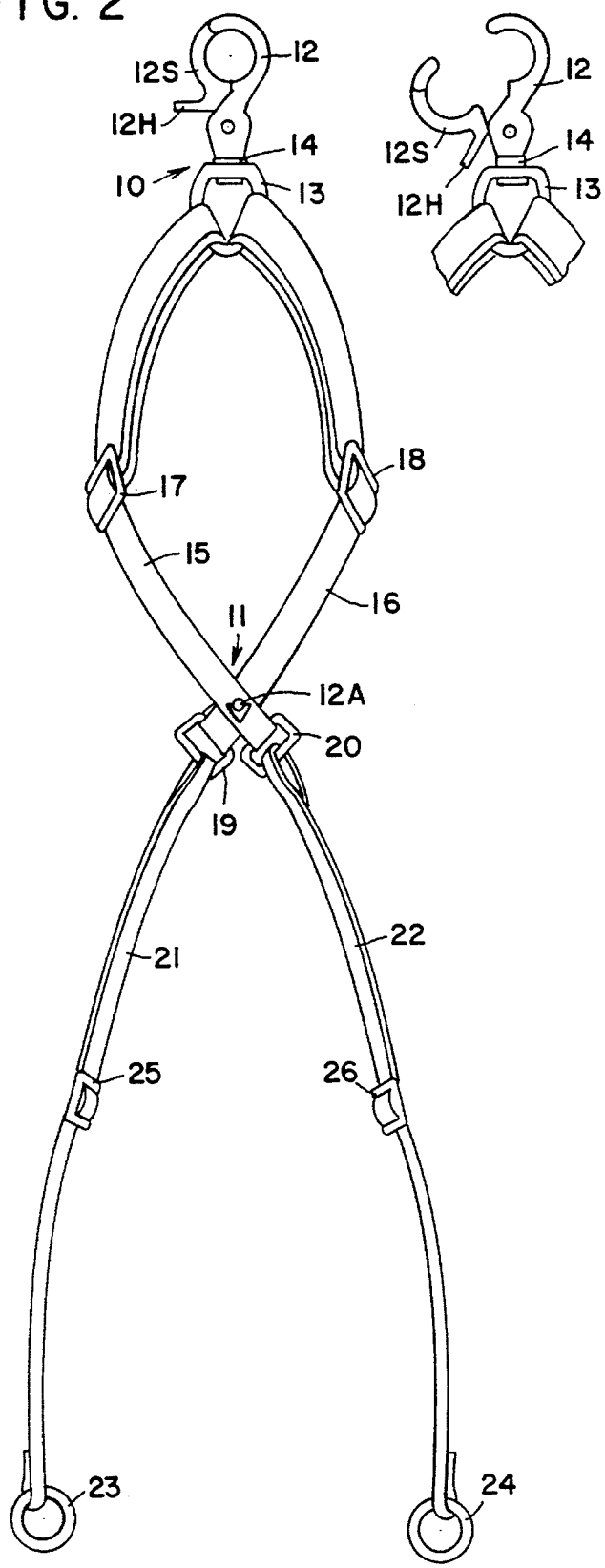
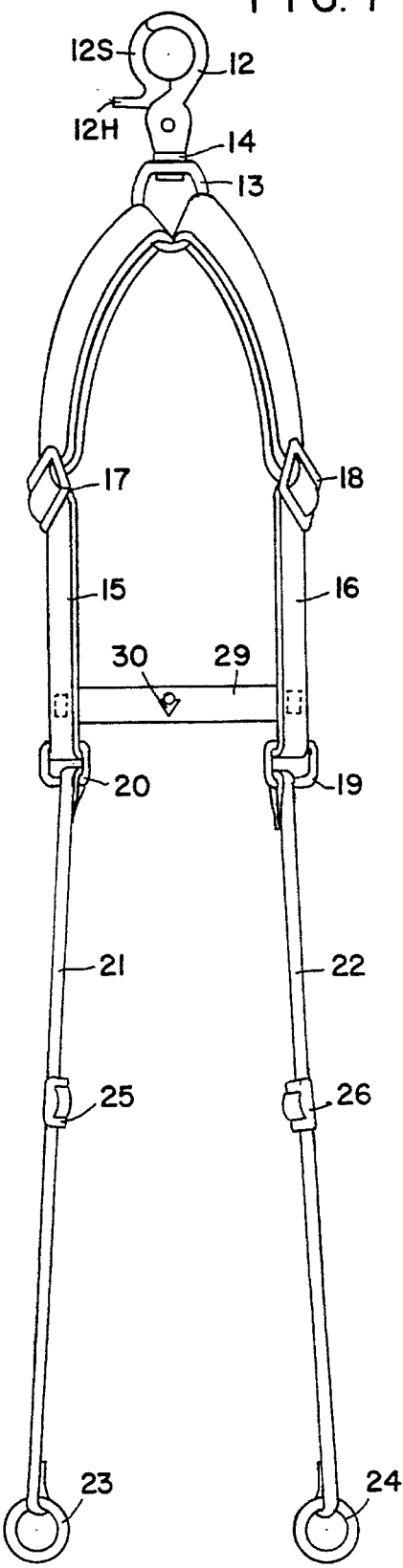

is decoupled from the trailing ends of the straps, these ends are then free to slip through the opening in the shoulder junction and thereby decouple the harness from the dog. To avoid this, the trailing ends are held together by a Velcro fastener. And the shoulder junction is provided with a traverse bar that divides the opening whereby when the leash is decoupled, the held-together trailing ends of the straps are intercepted by the bar to prevent these ends from slipping through the opening. This harness arrangement, though workable, is relatively complex and costly.

SUMMARY OF INVENTION

In view of the foregoing, the main object of this invention is to provide a leash-controllable dog harness of relatively simple and inexpensive design adapted to apply pressure to the highly-sensitive pits of the dog's forelegs and thereby inhibit a dog wearing the harness from taking any action not acceptable to the holder of the leash.

Among the significant features of an improved leash-controllable dog harness in accordance with the invention are the following:

A. The harness includes no neck collar that must be fitted to the neck of the dog being harnessed, nor does the harness include releasable buckles that must be unbuckled to install the harness.

B. The harness does not physically restrain or hobble foreleg movement of the dog.

C. The effectiveness of the harness does not depend on the size and strength of the dog or on its breed, for it is effective on all dogs of all breeds.

More particularly, an object of this invention is to provide a harness of the above type which includes a pair of restraint cable which pass through the respective foreleg crotches of the harnessed dog and are coupled to a leash whereby when the leash is strained, the cables then ride up the crotches to engage and apply pressure to the highly sensitive foreleg pits.

Still another object of the invention is to provide a leash-controllable harness that include straps of adjustable length formed of high-strength fabric webbing and restraint cables formed of a braided fabric so that the harness, which is comfortable to wear, may be quickly installed on the dog, and may be mass-produced at relatively low cost.

Yet another object of this invention is to provide soft protective sleeves for the restraint cables of the harness which prevent the cables sliding through the sleeves from chafing or otherwise irritating the dog.

Also, an object of this invention is to provide a harness adapted to conform to a relatively large dog.

Briefly stated, these objects are attained by a leash-controllable dog harness adapted to inhibit a dog from straining against a leash held by an individual walking the dog, the harness inducing the dog to come to a halt or to walk at a pace acceptable to the leash holder. The harness includes a shoulder junction provided with an openable loop which overlies the dog's shoulder intermediate its right and left forelegs, and a chest junction which lies adjacent the dog's chest intermediate the foreleg crotches.

Extending between the shoulder and chest junctions on opposite sides of the dog is a pair of straps whose lengths are adjustable to accommodate the harness to the dog. Extending from the chest junction is a pair of restraint cables, one passing through the right foreleg crotch and then through the loop of the shoulder junction to terminate in a first ring, the other passing through the left foreleg crotch and then through the same loop to termiante in a second ring. Both rings are coupled to the leash whereby when the leash is strained, the cables are concurrently caused to ride up the respective crotches to impose pressure on the sensitive foreleg pits. This action induces the dog to seek to relieve the pressure by slowing down its pace or coming to a halt, depending on the degree of pressure applied to the pits.

BRIEF DESCRIPTION OF DRAWINGS

For a better understanding of the invention as well as other objects and further features thereof, reference is made to the following detailed description to be read in conjunction with the accompanying drawings, wherein:

FIG. 1 shows a dog wearing a harness in accordance with a first embodiment of the invention;

FIG. 2 separately illustrates the first embodiment of the harness;

FIG. 3 separately shows the shoulder junction included in the harness;

FIG. 4 shows a protective sleeve for a harness cable;

FIG. 5 shows the sleeve mounted on a cable going through a foreleg crotch;

FIG. 6 is a section taken through the sleeve; and

FIG. 7 illustrates a second embodiment of a harness in accordance with the invention.

DETAILED DESCRIPTION OF INVENTION

First Embodiment

Referring now to FIGS. 1 to 3, illustrated in these figures is a first embodiment of a harness in accordance with the invention that is suitable for dogs whose sizes range from small to large, but may not accommodate very large dogs having broad chests.

The harness includes a shoulder junction, generally identified by reference numeral 10. When the harness is installed, junction 10 then overlies the shoulder of dog D intermediate its right and left forelegs $F_1$ and $F_2$. Also included is a chest junction 11 which lies adjacent the chest of the dog intermediate the crotches of the right and left forelegs. Chest junction 11 which is created at the intersection of the trailing ends of the harness straps, is provided with a metal rivet 12. This rivet joins the straps and is provided with a link pivoted on at its head to which a dog tag is attachable to identify the dog.

Shoulder junction 10, which may be formed of metal or high-strength synthetic plastic, such as polypropylene, is composed of an openable clasp or loop 12 and a link 13 attached to the base of the loop by a bolt 14, the link being rotatable on the bolt. As shown separately in FIG. 3, loop 12 is provided with a pivoted spring-biased arcuate section 12S having a short lever 12H. When lever 12H is pressed by an operator to open the loop, restraint cables may then be inserted therein. Extending between link 13 of the shoulder junction 10 and chest junction 11 and connected thereto on opposite sides of the dog is a pair of straps 15 and 16. The straps are provided with tri-slides 17 and 18, respectively, through which the straps are threaded whereby the straps may be adjusted in length to accommodate the harness to the size of dog D.

Straps 15 and 16 whose trailing ends intersect at rivet 12 of the chest junction 11, terminate in D-rings 19 and 20. The straps are preferably fabricated of high-strength fabric webbing, although, in practice, the straps may also be formed of

COLLARLESS DOG HARNESS AND LEASH JOINED THERETO

RELATED APPLICATIONS

This application is a continuation-in-part of my copending application Ser. No. 08/222,034, filed Apr. 4, 1994, entitled "IMPROVED LEASH-CONTROLLABLE DOG HARNESS" whose entire disclosure and the disclosures of the earlier filed applications relating thereto are incorporated herein by reference. Application Ser. No. 08/222,034 is a continuation-in-part of my earlier application Ser. No. 08/194,720, filed Feb. 10, 1994 (now U.S. Pat. No. 5,359,964), which in turn is a continuation-in-part of my still earlier application Ser. No. 08/023,638, filed Feb. 26, 1993 (now U.S. Pat. No. 5,429,886).

BACKGROUND OF INVENTION

1. Field of Invention

This invention relates generally to a dog harness which is connectible to a leash held by an individual walking the dog, and more particularly to a leash-controllable dog harness adapted to inhibit the dog from straining against the leash and inducing the dog to come to a halt or to walk at a pace acceptable to the leash holder.

2. Status of Prior Art

A leash is a chain or strap attached to the collar or harness of a dog, the leash being used to lead the dog or to hold it in check. As pointed out in the Bloom U.S. Pat. No. 2,233,397, when a dog strains against a leash attached to a dog harness, it is important that the harness then avoid a choking effect on the throat of the dog or undue pressure on throat muscles, cords and nerves, for these may have adverse effects on the lungs and heart of the dog. While Bloom discloses a non-choking harness, this harness does not act to discourage the dog from straining against the leash. Indeed, because the harness is non-choking, there is nothing to inhibit such straining and to hold the dog in check.

The need exists, therefore, for a harness to break older dogs of the habit of straining at the leash and for training younger dogs not to strain at the leash. When a dog strains at the leash, it may, in doing so, wrest the leash from the hands of its master who then loses control of the dog. But this is perhaps a less objectionable aspect of straining, for in the case of a master of advanced years or in relatively weakened condition, should the master hold tightly onto the strained leash to maintain control of the dog, the master may then be pitched to the ground or otherwise upset, with possibly damaging consequences.

To prevent straining at the leash, hobble-type dog harnesses are known, such as the hobble harness disclosed in the Patience et al. U.S. Pat. No. 2,670,712, which normally permits free movement of the animal but which restricts the action of the forelegs when the dog attempts to run away or otherwise go out of control.

The Patience et al. harness includes a conventional dog collar and a shoulder strap that has hoops at its opposite ends that loosely fit over the forelegs of the dog. The shoulder strap is adjustable so that the foreleg hoops can be drawn up but not so tightly as to interfere with normal movement of the dog's forelegs. However, if the dog strains on the leash, this strain is also exerted on the shoulder strap, and the foreleg hoops are then drawn upwardly so that movement of the forelegs is restrained and the dog will be brought to a halt.

A harness of the Patience et al. type imposes a physical restraint on the forelegs, and its effectiveness depends on the strength of the dog. Thus with a small dog, this harness may be fully effective, while with a large and more powerful dog, the harness may fail to restrain the dog, particularly if he succeeds in wresting the leash from the hands of his master.

My prior U.S. Pat. No. 4,964,369 (Sporn), discloses a dog harness acting to inhibit the dog from straining against the leash without, however, producing a choking action. The harness comprises a collar encircling the neck of the dog, and left and right restraint cables whose leading ends are connected to the front section of the collar at left and right positions thereon. The restraint cables go loosely under the left and right foreleg pits of the dog and through respective slip rings attached to the rear section of the collar, the trailing ends of the cables terminating in a coupler to which the leash is attached. When the harnessed dog strains at the leash, this acts to tighten the restraint cables which then impose a pressure on the foreleg pits. Because these pits are highly sensitive, the dog, in order to relieve this pressure, will then cease to strain against the leash and thereby again loosen the restraint cable.

While a harness of the type disclosed in my prior '369 patent is effective for its intended purpose, it requires a collar whose size is appropriate to the neck size of the dog on which it is installed. Also, this harness entails slip rings on the collar through which the restraint cables pass, the cables terminating in a common coupler to which the leash is attached. Since the cables are more or less tightened when the dog strains against the leash, the cables are in time abraded by the rings through which they pass.

My above-identified copending patent application discloses a leash-controllable dog harness adapted to inhibit a dog from straining against the leash held by an individual walking the dog, the harness inducing the dog to come to a halt or to walk at a pace acceptable to the leash holder. The harness is composed of a pair of loops and a shoulder junction having left and right openings, each loop being formed by a strap of adjustable length whose leading end is linked to the junction and whose trailing end slides through a respective opening and is coupled to the leash whereby when the leash is strained, both straps are then pulled. The loops are angled with respect to each other to interconnect at a crossover site.

When the harness is installed on a dog, the shoulder junction then overlies the dog's shoulder intermediate the right and left forelegs, and the crossover site lies adjacent the dog's chest, one strap running from the site through the right foreleg crotch, the other strap running from the site through the left foreleg crotch. Should the harnessed dog strain against the leash, this causes both straps to ride up the respective crotches to impose pressure on the highly-sensitive foreleg pits, whereby the dog, in order to relieve the resultant discomfort, then relaxes the strain.

The harness disclosed in my copending application has a distinct advantage over that disclosed in my prior patent, for it does not entail a collar. But in both instances, control of the dog is effected by applying pressure to the highly-sensitive foreleg pits which induces the dog to relax the strain on the leash.

In the harness disclosed in my copending application, the straps extending from the crossover site adjacent the dog's chest run through the right and left foreleg crotches and then pass through an opening in the shoulder junction so that the trailing ends of the straps extend beyond the shoulder junction to be coupled to the leash. Because when the leash belt leather or other material.

Coupled to D-rings 19 and 20 are the leading ends of restraint cable 21 and 22 whose trailing ends terminate in metal coupling rings 23 and 24. The restraint cables are preferably formed of a braided fabric of nylon or other high-strength fibers. Cables 21 and 22 are provided with tri-slides 23 and 24 for adjusting their length to accommodate the cables to the size of the dog on which the harness is installed.

As shown in FIG. 1, which illustrates the installed harness, the restraint cables 21 and 22 extending from chest junction 11, pass through the crotches of the right and left forelegs $F_1$ and $F_2$, and from there the cables go up opposite sides of the dog to pass through the loop 12 of the shoulder junction whereby the coupling rings 23 and 25 at the trailing ends of the cables are then outside of the loop. These rings are both coupled to the retractable clasp 27 of a leash 28.

To install the harness, the straps 15 and 16 whose lengths have been adjusted to accommodate dog D, are separated from each other to create an opening to admit the head of the dog, so that the shoulder junction 10 then lies over the shoulder of the dog, midway between the right and left forelegs, and the chest junction 11 then lies adjacent the dog's chest, midway between the foreleg crotches. Then the restraint cables 21 and 22 are extended from the chest junction 11 to pass through the foreleg crotches and then up opposite sides of the dog to pass through loop 12 of the shoulder junction 10.

When loop 12 of the shoulder junction is closed to capture the cables, the coupling rings 23 and 24 are then beyond the loop. The restraint cables 20 and 21 cannot then slide out of loop 12, for the coupling rings 23 and 24 are intercepted by the loop, the rings being too large to pass through loop 12 of the shoulder junction.

When, therefore, the harnessed dog is led by an individual holding leash 28 at an acceptable pace and the walking dog does not strain against the leash, the harness remains fairly loose and comfortable, and the cables passing through the foreleg crotches are then disengaged from the sensitive pits of the dog's forelegs. However, should the dog lurch ahead or seek to increase its pace so that it is moving faster than the individual walking the dog, the leash will then be strained. This strain will act to exert a pull on cable rings 23 and 24 which will draw the trailing ends of cables 21 and 22 coupled thereto further out of shoulder junction loop 12 and in doing so, tighten the cables passing through the crotches, thereby causing the cables to concurrently ride up the crotches to engage and press against the foreleg pits. The resultant discomfort will induce the dog to seek to relax the strain on the leash so that the cables no longer press against the sensitive pits.

If one wishes to remove the harness from the dog, the leash is disconnected from coupling rings 23 and 24, and loop 12 of the shoulder junction is then opened to release the restraint cables. One has only then to pull straps 15 and 16 over the head of the dog and the harness is then free of the dog.

Protective Sleeves

In the harness shown in FIG. 1 restraint cables 21 and 22 go through the left and right foreleg crotches, and when they are tightened, they rub against the surface of the dog. With continued use this action may cause chafing or irritation.

To avoid such chafing without however interfering with the ability of the harness to control the dog on which it is installed, mounted on each cable is an elongated protective sleeve 27. This sleeve is shown in connection with cable 21 in FIGS. 4, 5 and 6. Sleeve 27 has a tubular inner liner 28 formed of woven or knitted nylon or similar smooth fabric material, on which is anchored an outer coat 29 of Sherpa, cashmere wool or other soft, non-abrading material.

Sleeve 27, when mounted on a restraint cable, is so placed on the installed harness as to pass through the related foreleg crotch of the dog. When the cable is tightened because the leash is strained, the sleeve does not shift axially, but the cable which is within the sleeve, slides along the surface of the smooth, low-friction inner liner 28. As the cable is tightened, it causes the sleeve to ride up the foreleg crotch to engage the foreleg pit to apply pressure thereto. But because the sleeve is soft and not shifted axially, no chafing takes place.

The inner liner 28 of the sleeve is preferably fabricated of stretchable material so that when mounting the sleeve on a strap, the sleeve whose diameter is somewhat smaller than the width of the length adjusting tri-slide 25 on the cable 21, will stretch to permit the slide to pass through the sleeve.

Second Embodiment

The second embodiment of a harness in accordance with the invention which is shown in FIG. 7 is intended for relatively large dogs having a broader chest. However, it may be used with smaller dogs, for this harness is essentially the same as the harness shown in FIG. 1. The harness is provided with a pair of straps 15 and 16 and a pair of restraint cables 21 and 22, both the cables and the straps being adjustable in length by means of tri-slides.

The difference between the two embodiments lies in the chest junction. In FIG. 2, straps 15 and 16, at their trailing ends intersect at chest junction 11 and are held together by a rivet 12. However, in the harness shown in FIG. 7, the chest junction is formed by a short transverse strap 29 that bridges the trailing ends of straps 15 and 16 thereby creating a space therebetween to accommodate a relatively broad dog's chest. Hence restraint cable 21 and 22 coupled to the D-rings 19 and 20 at the trailing ends of the straps are then close to the foreleg crotches. Anchored at the center of bridging strap 29 is a link 30 to which a dog tag is attachable.

The bridging strap 29 also produces a larger opening between harness straps 15 and 16 to accommodate a large dog head. The smaller opening between the straps shown in the FIG. 2 embodiment of the harness is best suited for smaller dog heads.

In practice, bridging strap 29 may be shorter in length than the strap shown in FIG. 7 so that this harness is suitable for smaller dogs. It will be appreciated that the harness in both the first and second embodiment works in essentially the same fashion to impose pressure on the sensitive foreleg pits of the dog when the leash is strained to induce the dog to slow down or come to a halt. Thus if the holder of the leash wishes to just slow down the dog, he pulls the leash gently, whereas if he wishes to bring the dog to an immediate halt he then exerts a strong pull on the leash. Thus the reaction of the dog depends on the degree of pressure applied to the highly-sensitive foreleg pits.

While there have been shown preferred embodiments of a leash-controllable dog harness in accordance with the invention and protective sleeves therefor, it will be appreciated that many changes may be made thereon without departing from the spirit of the invention.

What is claimed is:

1. In combination, a leash held by a person walking a dog, and a leash-controllable dog harness adapted to inhibit the dog from straining against the leash, the harness inducing the dog to come to a halt or to walk at an acceptable pace, said harness comprising:

A. a shoulder junction adapted to overlie a dog's shoulder intermediate its right and left forelegs, each having a crotch leading to a sensitive pit, said shoulder junction including an openable loop;

B. a chest junction adapted to lie adjacent the dog's chest;

C. a pair of straps extending from the shoulder junction to the chest junction on opposite sides of the dog to conform the harness to the dog, said straps having an opening therebetween to receive the head of the dog whereby the harness may be installed on the dog or withdrawn therefrom;

D. a pair of restraint cables having leading ends coupled to the chest junction, said cables passing through the respective foreleg crotches and then up opposite sides of the dog and through the loop of the shoulder junction, said cables having trailing ends which extend beyond said loop and terminate in rings to which said leash is coupled whereby when the leash is strained, the cables are then caused concurrently to ride up the crotches to engage and impose pressure on the foreleg pits to induce the dog to seek to relieve the pressure by slowing down or coming to a halt depending on the degree of applied pressure.

2. A harness as set forth in claim 1, in which the straps intersect at the chest junction.

3. A harness as set forth in claim 2, in which the intersecting straps are joined together by a rivet.

4. A harness as set forth in claim 3, in which the rivet has a link pivoted on its head to receive a dog tag.

5. A harness as set forth in claim 1, in which the straps at the chest junction are spaced apart by a short, transverse bridging strap.

6. A harness as set forth in claim 1, in which the straps are formed of fabric webbing.

7. A harness as set forth in claim 1, in which the cables formed of braided fabric.

8. A harness as set forth in claim 1, in which the straps are provided with tri-slides to render them adjustable in length.

9. A harness as set forth in claim 1, in which the cables are provided with tri-slides to render them adjustable in length.

10. A harness as set forth in claim 1, in which the shoulder junction is provided with a link connected to the loop, to which link the leading ends of the straps are coupled.

11. A harness as called for in claim 10, in which the straps extending from the shoulder junction terminate in D-rings to which the leading ends of the cables are coupled.

12. A harness as set forth in claim 1, in which mounted on each cable is a soft protective sleeve within which the cable is slidable, said sleeve preventing the cable from chafing the dog.

13. A harness as set forth in claim 12, in which the sleeve is provided with a smooth inner liner to facilitate sliding therein of the cable.

14. A harness as set forth in claim 13, in which said sleeve has an outer cover having the properties of wool anchored on the liner.

* * * * *